Patented June 1, 1943

2,320,716

UNITED STATES PATENT OFFICE 2,320,716

TERPENE ADHESIVE

Frank W. Corkery, Crafton, and Samuel G. Burroughs, Pittsburgh, Pa., assignors to Pennsylvania Industrial Chemical Corporation, a corporation of Pennsylvania No Drawing. Application April 13, 1940, Serial No. 329,576

3 Claims. (Cl. 260—3)

This invention relates to adhesives, and particularly to adhesives purposed for use on tapes, strips and sheets of paper, fabric, transparent wrapping sheets, or backing structures of similar sort.

The invention arises from our discovery of the advantageous properties, in adhesives, of terpene resin derived by polymerization of a polymerizable constituent, or polymerizable constituents of terpene substances such as gum spirits and wood turpentine.

Adhesives which are usable on backing structures of the indicated sort, whether or no they have other utility, must as a primary consideration have tackiness, or potential tackiness effectively rising under the conditions of their use. Certain adhesives should cohere well in themselves, and to that end contain a strength-increasing ingredient. Unless the other constituents of the adhesive give inherently a substance which is adequately plasticized, the adhesive is made to include a plasticizer substance. For application under certain circumstances, such adhesives may be thinned or cut with evaporative solvent, and it is therefore of importance that all the several constituents of the adhesive should be soluble in solvent of a desired sort and in desired proportions.

It may also be observed that certain adhesives of the sort particularly under consideration are heat-sensitive adhesives, and that certain of them are pressure-sensitive adhesives.

We have discovered that in all such adhesives terpene resin may suitably and with advantage be uesd as a tack-producing ingredient.

Further considering the qualities desired in the adhesives of the various specific sorts particularly adapted to specific uses, for some purposes it is a matter of importance that the adhesive should not be subject to change detrimental to its adhesive properties, such as may result from oxidation, or drying. For some purpopes it is of importance that the adhesive have no odor, or at least its odor be pleasant; and that it be of light color, and have color stability. As above noted, for some purposes it is of importance that all the ingredients of the adhesive be adequately soluble in evaporative solvents of a sort desirable under the circumstances of use. For most purposes it is desirable that the adhesive should not be heat-convertible. In all adhesives of the kind, it is of importance that the several ingredients of the adhesive, including pigments or fillers of standard sort, should not be interreactive. In all such adhesives it is highly desirable that at least one of the typical ingredients be compatible within a wide range with other typical ingredients selective for the composition.

Considering resins as tack-producing ingredients of adhesives, of known sort and of primarily known formulation, all the above divergent requirements may be met by terpene resin. The inclusion of terpene resin in the adhesive presents substantial advantage over the inclusion of the resins previously used as tack-producing ingredients in adhesives, such for example as coumarone-indene resin, rosin, and ester gums. As an ingredient of an adhesive, terpene resin generally considered tends to impart to the composition light color; either no odor or but a slight and pleasing odor when the adhesive is heated; it tends to impart qualities of acid and alkali resistance to adhesive compositions; and tends to render the composition non-heat-convertible. Being itself of light and stable color, it tends to impart a continued light color to the adhesive; and does not tend to react with pigments, such as zinc oxide and whiting, when pigments are included in the adhesive composition.

The lowest terpene polymers (i. e. the terpene dimers) have an iodine value so high as to detract from their utility in adhesives in which an enduring tackiness is desired. The terpene polymers above the dimers oxidize so much less readily than the dimers, that we herein embrace them under the general term of "higher polymers." If a terpene resin contains such content of the higher polymers that it is solid at normal room temperature it has, and can impart, tackiness much more enduring than that of a liquid terpene polymerization product consisting essentially of dimers. If the resin consists essentially of the "higher" terpene polymers, oxidation is reduced to a point at which an adhesive containing it as its tack-producing content may be considered enduringly tacky. In the terpene resin, the highest melting point resin of which we have good examples is amply soluble in both the aromatic and aliphatic hydrocarbon solvents. We, therefore, by preference, include in our adhesives terpene resins which conform to the generally accepted standard of high melting resins.

Terpene polymers formed by the polymerization of a terpene starting material consisting essentially or preponderantly of beta-pinene in accordance with the procedure disclosed in the application of Samuel G. Burroughs, Serial No. 288,390, filed August 4, 1939, give a terpene resin of less than a color 1 on the paracoumarone resin color scale. That resin, which is itself a a new material of commerce, in accordance with its proportional inclusion of beta-pinene polymers and the procedure used in its recovery, has a melting point from about 80° C. (ball and ring), to a melting point substantially exceeding 100° C. (ball and ring), such as a melting point of about 150° C. (ball and ring) or even higher. We have discovered that such resin is one wholly suitable for inclusion in adhesives because it possesses but slight tendency to oxidize, possesses all the other qualities above noted as inherent in terpene resins generally; and even in its examples of higher melting point retains its solubility, compatibility, and thermoplastic properties. Whereas it is not the only terpene resin consisting essentially of terpene polymers higher than the dimers which may be made, it represents the highest qualities yet obtained in terpene resins, and is currently the typical example of a solid terpene resin produced by a method of commercially practicable sort.

Considering terpene resin as a tack-producing content in adhesives of the sort usable in making flypaper, masking strips for the regulated application of protective coatings, surgical tape, friction tape, and the like; we give exemplification of its use in adhesives for such purposes. An adhesive of high and enduring tackiness but low in cohesion, which is suitable for use on sticky flypaper, for banding trees, as a carrier for insecticides and dusting powders, and for like purposes, was made by mixing 40% white mineral oil and 60% of beta-pinene resin, having a melting point of approximately 115° C. (ball and ring). The mixture was made by warming together the white mineral oil and the resin.

We have discovered that even the highest melting terpene resins are very soluble in the aliphatic hydrocarbon solvents to an extent that such resins commercially represented by beta-pinene polymers melting about 80° C. (ball and ring) and higher, remain in solution in such solvents, even though they be included in the solution in very small proportion. The terpene resins do not have high solubility in alcohols and ketones.

Desirable pressure-sensitive adhesives contain high-melting terpene resin as a tack-producing content, in association with a strength-increasing substance, such as rubber. In such adhesives it is of advantage that a very large proportionate quantity of evaporative solvent be used in order to facilitate application of the adhesive to a surface. In such solutions the high solubility of the resin is a matter of prime importance. The retention of tackiness at low temperature is of primary importance in the pressure-sensitive examples of the adhesives, and retained thermoplasticity is a matter of primary importance in the heat-sensitive examples of such adhesives.

In the pressure-sensitive adhesives it is necessary, in order to obtain the cushion effect desired in adhesive functioning in that matter, that they contain a proportionally great quantity of rubber, and a plasticizer for it. Such adhesives preferably have a content of resin merely adequate to give tackiness, and adhesion between the surfaces which are to be bonded by the adhesives. A typical example of a pressure-sensitive adhesive of this sort may be made up of 5 parts of pale crepe rubber, 5 parts of white mineral oil, and 2 parts of beta-pinene resin, having a melting point of about 115° C. (ball and ring). For application to its backing, such adhesive may be dissolved in 100 parts of evaporative solvent, such as light petroleum naphtha, which is a good solvent for the rubber.

Heat sensitive adhesives which are essentially thermoplastic in nature desirably contain as high a proportion of resin as is consistent with cohesion in itself and initial adhesion under the temperature conditions at which they are applied. A typical heat sensitive adhesive of this sort suitable for bonding foil to paper, Cellophane to paper, and paper to paper, or to wood and the like, may be made to include 10 parts of beta-pinene resin melting at about 115° C. (ball and ring) as a tack-producing content, 8 parts of strength-increasing material, such as rubber hydrochloride, and 10 parts of plasticizer, which suitably may be methylabietate. Such an adhesive may be applied to the backing as a hot melt, or may be prepared for application by making a dilute solution of it, such as a solution in 200 parts of evaporative solvent.

For surgical tape and for certain other uses the adhesive composition may contain zinc oxide and medicaments of various sorts. Also, in an adhesive for use as an element of masking tape, used widely in painting automobiles, various other pigments or fillers may be used to lessen its adhesiveness to a hard surface, while causing adhesion to a softer surface. With all pigments and medicaments thus commonly in use terpene resin is inert.

In our adhesives containing terpene resin as a tack-producing content, rubber is to be taken as representative of a class of high molecular weight materials, possessing high tensile strength and rubber-like properties. Thus, the strength-increasing material may for example be milled rubber, chlorinated rubber, rubber hydrochloride, oil gels, non-vulcanizable synthetic rubbers, such as isobutylene polymers, and the hydrocarbon-soluble types of acrylic acid esters, such as the lower molecular weight polymers of butyl methylacrylate. With all such strength-increasing substances, terpene resin is compatible.

The white mineral oil given in the examples may be taken as representative of a class of substantially inert, or at least relatively inactive plasticizers, such as methyl abietate, hydrogenated methyl abietate, soya bean oil, castor oil, dibutyl phthalate, diamyl phthalate, dibutyl tartrate, and various high boiling esters, and low polymers low in drying properties. With all such plasticizers terpene resin is compatible, and the high molecular weight strength-increasing materials of rubber-like properties are also compatible.

White mineral oil has been given as a typical example of desirable plasticizers, because it is inert, odorless, colorless, non-oxidizable, and of low cost. It is of moment that a relatively high melting terpene resin particularly desirable because of its decreased tendency to oxidize, be compatible in all proportions with that plasticizer. This is a particularly striking quality of the terpene resin. In certain adhesives, such as those given above to exemplify adhesives having good cohesion in themselves, it is usual to apply the adhesive from solution in light petroleum solvents, the solution being so dilute that a small content of most resins tends to precipitate from it or to crystallize from it, to spoil the properties of the adhesive. In such use terpene resin, by reason of its solubility, gives an adhesive superior to one in which some other resin, such as coumarone-indene resin, is included.

Our invention therefore resides in our discovery of the marked and peculiar advantages derivable from the inclusion of terpene polymers, of the sorts specified, in adhesives of known typical sorts and made in accordance with primarily typical formulation.

Where melting point is given without qualification in the specification and claims, it is to be assumed that it is taken by the ball and ring method of softening point determination. Where parts, or proportions are given, such parts or proportions are to be taken as by weight.

We claim as our invention:

1. An adhesive composition composed essentially of rubber, white mineral oil, and a tack-imparting content of beta-pinene polymers melting within the approximate range of 80° C. to 150° C. and compatible with the rubber and with the white mineral oil.

2. An adhesive composition composed essentially of rubber, a substantially inactive liquid plasticizer for the said rubber, and a tack-imparting content of beta-pinene polymers melting within the approximate range of 80° C. to 150° C. and compatible with the said rubber and with said substantially inactive liquid plasticizer.

3. An adhesive composition composed essentially of a material selected from the group comprising rubber, chlorinated rubber and rubber hydrochloride, white mineral oil, and a tack imparting content of beta-pinene polymers melting within the approximate range of 80° C. to 150° C. and compatible with the said material and the said white mineral oil.

FRANK W. CORKERY.
SAMUEL G. BURROUGHS.